US007634798B2

(12) United States Patent
Watson

(10) Patent No.: US 7,634,798 B2
(45) Date of Patent: *Dec. 15, 2009

(54) SYSTEM AND METHOD FOR ENHANCED BROADCASTING AND INTERACTIVE TELEVISION

(75) Inventor: Scott Watson, Santa Clarita, CA (US)

(73) Assignee: The Walt Disney Company, Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/044,208

(22) Filed: Mar. 7, 2008

(65) Prior Publication Data

US 2008/0155633 A1 Jun. 26, 2008

Related U.S. Application Data

(63) Continuation of application No. 09/706,055, filed on Nov. 3, 2000, now Pat. No. 7,409,700.

(51) Int. Cl.
H04N 5/445 (2006.01)
H04N 7/173 (2006.01)
G06F 13/00 (2006.01)
G06F 3/00 (2006.01)
G06F 15/16 (2006.01)

(52) U.S. Cl. .................... 725/112; 725/40; 725/51; 725/133; 725/141; 709/219

(58) Field of Classification Search ................ 709/219; 725/40, 51, 112, 133, 141
See application file for complete search history.

(56) References Cited

U.S. PATENT DOCUMENTS

| 3,947,972 A | 4/1976 | Freeman |
| 4,071,697 A | 1/1978 | Bushnell et al. |
| 4,078,316 A | 3/1978 | Freeman |
| 4,107,735 A | 8/1978 | Frohbach |

(Continued)

FOREIGN PATENT DOCUMENTS

CA 1172847 8/1984

(Continued)

OTHER PUBLICATIONS

Gergelder, Nobert; "Video Application in Multimedia Systems and Computer Networks"; SMPTE Journal; Nov. 1996, vol. 105, No. 11 pp. 689-697.

(Continued)

Primary Examiner—Hunter B. Lonsberry
(74) Attorney, Agent, or Firm—Ference & Associates LLC

(57) ABSTRACT

An enhanced interactive television broadcast is disclosed wherein an audio/video broadcast is viewed on a first display system, and an "enhancement" to the broadcast is simultaneously viewed or experienced on a second, separate display system. The "enhancement" is synchronized to the broadcast, and delivered to a user as a code fragments, such as a JavaScript message. URLs are not required. Portions or elements of a web page are reduced to single code fragments, rendered client-side upon receipt. The invention implements Network Time Protocol (NTP) to synchronize the client's application clock to global time. Messages, or JavaScript code fragments, are time-stamped and evaluated based on the client's application clock.

38 Claims, 5 Drawing Sheets

U.S. PATENT DOCUMENTS

| | | |
|---|---|---|
| 4,117,605 A | 10/1978 | Kurland et al. |
| 4,264,924 A | 4/1981 | Freeman |
| 4,264,925 A | 4/1981 | Freeman et al. |
| 4,320,256 A | 3/1982 | Freeman |
| 4,351,075 A | 9/1982 | Pittard, Jr. |
| 4,361,851 A | 11/1982 | Asip et al. |
| 4,372,558 A | 2/1983 | Shimamoto et al. |
| 4,405,829 A | 9/1983 | Rivest et al. |
| 4,451,700 A | 5/1984 | Kempner et al. |
| 4,451,701 A | 5/1984 | Bendig |
| 4,507,680 A | 3/1985 | Freeman |
| 4,546,382 A | 10/1985 | McKenna et al. |
| 4,566,030 A | 1/1986 | Nickerson et al. |
| 4,567,512 A | 1/1986 | Abraham et al. |
| 4,573,072 A | 2/1986 | Freeman |
| 4,581,484 A | 4/1986 | Bendig |
| 4,584,602 A | 4/1986 | Nakagawa |
| 4,591,248 A | 5/1986 | Freeman |
| 4,592,546 A | 6/1986 | Fascenda et al. |
| 4,594,476 A | 6/1986 | Freeman |
| 4,602,279 A | 7/1986 | Freeman |
| 4,603,232 A | 7/1986 | Kurland et al. |
| 4,646,145 A | 2/1987 | Percy et al. |
| 4,658,290 A | 4/1987 | McKenna et al. |
| 4,694,490 A | 9/1987 | Harvey et al. |
| 4,734,858 A | 3/1988 | Schlafly |
| 4,745,468 A | 5/1988 | Von Kohorn |
| 4,752,954 A | 6/1988 | Masuko |
| 4,792,968 A | 12/1988 | Katz |
| 4,816,904 A | 3/1989 | McKenna et al. |
| 4,845,739 A | 7/1989 | Katz |
| 4,847,698 A | 7/1989 | Freeman |
| 4,847,699 A | 7/1989 | Freeman |
| 4,847,700 A | 7/1989 | Freeman |
| 4,876,592 A | 10/1989 | Von Kohorn |
| 4,877,408 A | 10/1989 | Hartsfield |
| 4,893,248 A | 1/1990 | Pitts et al. |
| 4,907,079 A | 3/1990 | Turner et al. |
| 4,918,516 A | 4/1990 | Freeman |
| 4,918,603 A | 4/1990 | Hughes et al. |
| 4,926,255 A | 5/1990 | Von Kohorn |
| 4,930,011 A | 5/1990 | Kiewit |
| 4,930,150 A | 5/1990 | Katz |
| 4,977,455 A | 12/1990 | Young |
| 4,989,233 A | 1/1991 | Schakowsky et al. |
| 4,989,234 A | 1/1991 | Schakowsky et al. |
| 4,998,199 A | 3/1991 | Tashiro et al. |
| 5,013,038 A | 5/1991 | Luxenberg |
| 5,014,125 A | 5/1991 | Pocock et al. |
| 5,018,736 A | 5/1991 | Pearson et al. |
| 5,034,807 A | 7/1991 | Von Kohorn |
| 5,035,422 A | 7/1991 | Berman |
| 5,068,733 A | 11/1991 | Bennett |
| 5,073,931 A | 12/1991 | Audebert et al. |
| 5,083,271 A | 1/1992 | Thacher et al. |
| 5,083,800 A | 1/1992 | Lockton |
| 5,091,877 A | 2/1992 | Itoh et al. |
| 5,093,921 A | 3/1992 | Bevins, Jr. |
| 5,101,267 A | 3/1992 | Morales-Garza |
| 5,120,076 A | 6/1992 | Luxenberg et al. |
| 5,128,752 A | 7/1992 | Von Kohorn |
| 5,140,419 A | 8/1992 | Galumbeck et al. |
| 5,142,690 A | 8/1992 | McMullan, Jr. et al. |
| 5,155,591 A | 10/1992 | Wachob |
| 5,218,631 A | 6/1993 | Katz |
| 5,223,923 A | 6/1993 | Morales-Garza |
| 5,226,177 A | 7/1993 | Nickerson |
| RE34,340 E | 8/1993 | Freeman |
| 5,236,199 A | 8/1993 | Thompson, Jr. |
| 5,251,324 A | 10/1993 | McMullan, Jr. |
| 5,257,099 A | 10/1993 | Morales-Garza |
| 5,267,314 A | 11/1993 | Stambler |
| 5,283,734 A | 2/1994 | Von Kohorn |
| 5,287,181 A | 2/1994 | Holman |
| 5,311,423 A | 5/1994 | Clark |
| 5,343,239 A | 8/1994 | Lappington et al. |
| 5,351,075 A | 9/1994 | Herz et al. |
| 5,351,285 A | 9/1994 | Katz |
| 5,354,069 A | 10/1994 | Guttman et al. |
| 5,363,433 A | 11/1994 | Isono |
| 5,382,970 A | 1/1995 | Kiefi |
| 5,423,555 A | 6/1995 | Kidrin |
| 5,438,355 A | 8/1995 | Palmer |
| 5,453,015 A | 9/1995 | Vogel |
| 5,453,794 A | 9/1995 | Ezaki |
| 5,458,494 A | 10/1995 | Krohn et al. |
| 5,462,275 A | 10/1995 | Lowe et al. |
| 5,479,268 A | 12/1995 | Young et al. |
| 5,481,542 A | 1/1996 | Logstn et al. |
| 5,508,731 A | 4/1996 | Kohorn |
| 5,518,253 A | 5/1996 | Pocock et al. |
| 5,524,073 A | 6/1996 | Stambler |
| 5,526,035 A | 6/1996 | Lappington et al. |
| 5,530,469 A | 6/1996 | Garfinkle |
| 5,534,913 A | 7/1996 | Majeti et al. |
| 5,537,141 A | 7/1996 | Harper et al. |
| 5,537,143 A | 7/1996 | Steingold et al. |
| 5,538,255 A | 7/1996 | Barker |
| 5,539,471 A | 7/1996 | Myhrvold et al. |
| 5,543,849 A | 8/1996 | Long |
| 5,547,202 A | 8/1996 | Tsumura |
| 5,553,221 A | 9/1996 | Reimer et al. |
| 5,555,303 A | 9/1996 | Stambler |
| 5,558,339 A | 9/1996 | Perlman |
| 5,564,073 A | 10/1996 | Takahisa |
| 5,570,126 A | 10/1996 | Blahut et al. |
| 5,570,295 A | 10/1996 | Isenberg et al. |
| 5,572,442 A | 11/1996 | Schulhof et al. |
| 5,585,858 A | 12/1996 | Harper et al. |
| 5,586,121 A | 12/1996 | Moura et al. |
| 5,586,937 A | 12/1996 | Menashe |
| 5,589,892 A | 12/1996 | Knee et al. |
| 5,612,730 A | 3/1997 | Lewis |
| 5,617,565 A | 4/1997 | Augenbraun et al. |
| 5,623,589 A | 4/1997 | Needham et al. |
| 5,632,007 A | 5/1997 | Freeman |
| 5,633,918 A | 5/1997 | Mankovitz |
| 5,640,192 A | 6/1997 | Garfinkle |
| 5,641,319 A | 6/1997 | Stoel et al. |
| 5,643,088 A | 7/1997 | Vaughn et al. |
| 5,646,998 A | 7/1997 | Stambler |
| 5,649,284 A | 7/1997 | Yoshinobu |
| 5,659,366 A | 8/1997 | Kerman |
| 5,668,592 A | 9/1997 | Spaulding, II |
| 5,677,708 A | 10/1997 | Matthews, III et al. |
| 5,679,077 A | 10/1997 | Pocock et al. |
| 5,682,196 A | 10/1997 | Freeman |
| 5,684,918 A | 11/1997 | Abecassis |
| 5,689,799 A | 11/1997 | Dougherty et al. |
| 5,694,163 A | 12/1997 | Harrison |
| 5,694,334 A | 12/1997 | Donahue et al. |
| 5,695,401 A | 12/1997 | Lowe et al. |
| 5,696,905 A | 12/1997 | Reimer et al. |
| 5,708,845 A | 1/1998 | Wistendahl et al. |
| 5,724,091 A | 3/1998 | Freeman et al. |
| 5,724,103 A | 3/1998 | Batchelor |
| 5,729,252 A | 3/1998 | Fraser |
| 5,734,413 A | 3/1998 | Lappington et al. |
| 5,734,437 A | 3/1998 | Back |
| 5,752,836 A | 5/1998 | Clark et al. |
| 5,761,602 A | 6/1998 | Wagner et al. |
| 5,761,606 A | 6/1998 | Wolzien |
| 5,774,664 A | 6/1998 | Hidary et al. |
| 5,774,666 A | 6/1998 | Portuesi |

| | | | |
|---|---|---|---|
| 5,778,181 A | 7/1998 | Hidary et al. | |
| 5,782,692 A | 7/1998 | Stelovsky | |
| 5,793,302 A | 8/1998 | Stambler | |
| 5,818,441 A | 10/1998 | Throckmorton et al. | |
| 5,848,352 A | 12/1998 | Dougherty et al. | |
| 5,859,662 A | 1/1999 | Cragun et al. | |
| 5,860,862 A | 1/1999 | Junkin | |
| 5,861,881 A | 1/1999 | Freeman et al. | |
| 5,884,032 A | 3/1999 | Bateman et al. | |
| 5,887,243 A | 3/1999 | Harvey et al. | |
| 5,889,950 A | 3/1999 | Kuzma | |
| 5,898,919 A | 4/1999 | Yuen | |
| 5,905,865 A | 5/1999 | Palmer et al. | |
| 5,907,322 A | 5/1999 | Kelly et al. | |
| 5,907,715 A | 5/1999 | Stoel et al. | |
| 5,912,700 A | 6/1999 | Honey et al. | |
| 5,917,893 A | 6/1999 | Katz | |
| 5,931,408 A | 8/1999 | Ishii | |
| 5,931,908 A | 8/1999 | Gerba et al. | |
| 5,936,541 A | 8/1999 | Stambler | |
| 5,969,715 A | 10/1999 | Dougherty et al. | |
| 5,974,148 A | 10/1999 | Stambler | |
| 5,987,376 A | 11/1999 | Olson et al. | |
| 5,989,919 A | 11/1999 | Yuen | |
| 6,003,073 A | 12/1999 | Solvason | |
| 6,004,211 A | 12/1999 | Brenner et al. | |
| 6,006,256 A | 12/1999 | Zdepski et al. | |
| 6,016,344 A | 1/2000 | Katz | |
| 6,018,768 A * | 1/2000 | Ullman et al. | 709/218 |
| 6,021,307 A | 2/2000 | Chan | |
| 6,021,433 A | 2/2000 | Payne et al. | |
| 6,025,837 A | 2/2000 | Matthews, III et al. | |
| 6,058,430 A | 5/2000 | Kaplan | |
| 6,061,719 A | 5/2000 | Bendinelli et al. | |
| 6,064,420 A | 5/2000 | Harrison et al. | |
| 6,064,438 A | 5/2000 | Miller | |
| 6,067,107 A | 5/2000 | Travaille et al. | |
| 6,073,931 A | 6/2000 | Voden | |
| 6,075,527 A | 6/2000 | Shimamoto et al. | |
| 6,080,063 A | 6/2000 | Khosla | |
| 6,135,881 A | 10/2000 | Abbott | |
| 6,144,991 A * | 11/2000 | England | 709/205 |
| 6,173,317 B1 * | 1/2001 | Chaddha et al. | 709/219 |
| 6,183,366 B1 | 2/2001 | Goldberg et al. | |
| 6,198,509 B1 | 3/2001 | Dougherty et al. | |
| 6,199,206 B1 | 3/2001 | Ota et al. | |
| 6,230,325 B1 | 5/2001 | Iinuma et al. | |
| 6,233,736 B1 | 5/2001 | Wolzien | |
| 6,340,159 B1 * | 1/2002 | Giangrante | 273/272 |
| 6,443,840 B2 | 9/2002 | Kohorn | |
| 6,510,557 B1 | 1/2003 | Thrift | |
| 6,513,069 B1 | 1/2003 | Abato et al. | |
| 7,320,139 B2 | 1/2008 | Audebert et al. | |

FOREIGN PATENT DOCUMENTS

| | | |
|---|---|---|
| CA | 2246023 | 3/1999 |
| EP | 0655265 A1 | 5/1995 |
| EP | 704832 A2 | 4/1996 |
| EP | 0 714 684 A | 6/1996 |
| EP | 723369 | 7/1996 |
| EP | 0 745 412 A | 12/1996 |
| EP | 0757485 A2 | 2/1997 |
| EP | 0 852 443 A | 7/1998 |
| EP | 0982943 A2 | 3/2000 |
| GB | 1287304 | 8/1972 |
| GB | 2057174 A | 3/1981 |
| GB | 2120507 A | 11/1983 |
| GB | 2161629 A | 1/1986 |
| JP | 7-75076 | 3/1995 |
| JP | 9-46651 | 2/1997 |
| JP | 9102944 | 4/1997 |
| JP | 10145687 | 5/1998 |
| JP | 10155119 | 6/1998 |
| JP | 10164529 | 6/1998 |
| JP | 10-271484 | 10/1998 |
| JP | 10-334051 | 12/1998 |
| WO | WO 86/02753 | 5/1986 |
| WO | WO 87/00375 | 1/1987 |
| WO | WO 89/06405 | 7/1989 |
| WO | WO 94/03247 | 2/1994 |
| WO | WO 96/07270 A1 | 3/1996 |
| WO | WO 96/13124 | 5/1996 |
| WO | WO 97/19556 | 5/1996 |
| WO | WO 97/27546 | 7/1997 |
| WO | WO 97/27683 | 7/1997 |
| WO | WO 97/33434 | 9/1997 |
| WO | WO 99/04568 | 1/1999 |
| WO | WO 99/35831 A | 7/1999 |

OTHER PUBLICATIONS

Du, David H.C. Lee, Yen-Jen, Ma; Wei-Hstu; and McCahill, Mark P.; Video-based Hypermedia for Education-On-Demand; "Proceedings" ACM Multimedia 96; Boston Massachusetts, Nov. 18-22, 1996; pp. 449-450.

Blake, Pat; Turning on the Net; Telephony; Nov. 11, 1996; pp. 34, 38 & 40.

Hufftaker, Mike; "Coax"; Telephony; Nov. 27, 1995; pp. 44, 46, 48, 50-51.

Quyyum, Hamid; "Using DVDs and VDI for Interactive Television"; IEEE Transactions on Consumer Electronics vol. No. 3, Aug. 1996; pp. 657-666.

Batchelor, Steve; Throckmorton, John; "Enabling a New Medium for PC-based Multimedia Systems"; 1996 Digest of Technical Papers "International Conference on Consumer Electronics"; Jun. 5-7, 1996; pp. 320-321.

McCane, Steven Ray; "Scalable Compression and Transmission on Internet Multicast Video"; Computer Science Division; University of California; Berkeley California; Report No. UCB/CSD-96-928; Dec. 16, 1996; pp. 1-170.

Comerford, Richard; "Interactive Media: An Internet Reality"; IEEE Spectrum; Apr. 1996; pp. 29-32.

Bulterman, Dick C.A.; "Embedded Video in Hypermedia Documents: Supporting Integration and Adaptive Control"; ACM Tranactions on Information Systems; vol. 13, No. 4, Oct. 1995; pp. 440-470.

"Further Papers"; Montreux 1995; Jun. 13, 1995; Exhibition 9-13.

"Programme Production"; Montreux 1995; Jun. 13, 1995; Exhibition 9-13.

"Cable Satellite Terrestrial"; Montreux 1995; Jun. 13, 1995; Exhibition 9-13.

"Tagungsband"; FKTG (Femseh-und Kinotechnische Geselschaft); vol. 20, May 16-20, 1994.

Electronics Division; "Time Between Pictures—The Vertical Blanking Interval"; Colloquium; Digest No. 1994/016; Tuesday, Jan. 25, 1994.

Prof. Dr.-Ing. H. Schroder; "Multimedia: Anwendungen, Technologie, Systeme"; ITG-Gachbericht; Oct. 4-6, 1995, Dortmund.

Dr.-Ing. Gangolf Hirtz; "Wide-Screen Signalisierung"; Femseh-Und Kino-Technik; 49. Jahrgang Nr. 7-8/1995; pp. 429-437.

Dr.-Ing. Stephen Breide; "Interaktives Femsehen" ("Service on Demand"); Femse-Und Kino-Technik; 49. Jahrgang Nr. 3/1995.

Tarrant, D.R.; "Aspects of Enhanced Teletext"; IBC95; Conference Publication No. 413; Sep. 14-18, 1995: Amsterdam pp. 406-411.

Kaltenborn, R.D.; Mitchell, G.; "IBM-ITN Desktop News Service"; IBM United Kingdom Ltd./Independent Television News, UK; International Broadcasting Convention, Sep. 16-20, 1994; Conference Publication No. 397 pp. 509-514.

Yassini, Rouzbeh; "Cable TV's Hybrid Fiber Coax (HFC) Infrastructure for Data Communications"; NCTA Technical Papers; 1995-pp. 392-397.

Perry, Burt; Williams, David M.; "Rich Online Services as the Archetype for Interactive TV"; 1994 NCTA Technical Papers; 43rd Annual NCTA Convention and Exposition, May 22-25, 1994.

"Services at Your Fingertips"; Philips Telecommunication Review; vol. 52, No. 4.

Matsuura, Yumiko; Kinohara, Seishi; Kubozono, Ryuji; Inagaki, Michihiro; and Gomi, Kazuhiro; "Browse Search using Audio Key-Information for Multimedia On-Demand Systems"; IEEE Transactions on Consumer Electronics, IEEE Consumer Electronics Society; Nov. 1996, vol.

Yanagimachi, Akio; Usui, Kazuya; Ueno, Mikihiro; Ohya, Akira; Nishizawa, Taiji; Kai, Kenjiro; and Isobe, Tadashi; "Interactivity in Broadcasting and its Application to ISDB Services"; IEEE Transactions on Consumer Electronics, IEEE Consumer Electronics Society; September.

Usui, Kazuya; Ohya, Akira; Nishizawa, Taiji; and Kai, Kenjiro; "Multimedia Services in the HDTV MUSE System"; IEEE Transactions on Broadcasting; Sep. 1996, vol. 42, No. 3 pp. 194-199.

Ueno, Mikihiro; Seno, Hiroshi; Kay, Kenjiro; and Isobe, Tadashi; "TV Newspapers in ISDB Multimedia Information Broadcasting Services"; IEEE Transactions on Broadcasting; Sep. 1996, vol. 42. No. 3 pp. 187-193.

Jones, Lynn; "Internet Access via Cable TV: High Speed Access to the Information Highway"; 1995 NCTA Technical Papers; pp. 398-413.

Smith, Ian; Sawhney, Nitin "Nick"; and Balcom, David; "Hypercafe: Narrative and Aesthetic Properties of Hypervideo"; The Georgia Institute of Technology, School of Literature, Communications and Culture: College of Computing; Hypertext 96, Washington, D.C., pp. 1-10.

Roseman, Mark; Greenberg, Saul; "Teamrooms: Network Places for Collaboration" Dept. of Computer Science, University of Calgary; Computer Supported Cooperative Work, 96 pp. 325-333.

Sorenson, Tryggve; Solvoll, Dag Maartmann-Moe, Erling; Lovett, Hilde; Bryhni, Haakon; "On-Demand Regional Television Over the Internet"; Norwegian Computing Center; ACM Multimedia 96; Boston, MA pp. 99-107.

Buford, John F.; "Evaluating HyTime: An Examination and Implementation Experience"; Multimedia Systems Laboratory, Department of Computer Science, University of Massachusetts Lowell; Hypertext 96; Washington, D.C. pp. 105-115.

"Carriers, Convergence & Competition"; Telephony; Nov. 11, 1996, vol. 231, No. 20.

European Patent Application No. 96100183.1; filed: Jan. 8, 1996; "Data Communication Method and Apparatus for Requesting and Responding to Information"; Inventor: Ando, Ichiro.

UK Patent Application No. 9701082.1; filed: Jan. 20, 1997; "Network Database System"; Inventor: Linuma, Kazumoto.

UK Patent Application No. 9620741.0; filed: Jan. 20, 1997; "Interactive Radio/TV Broadcast Uses Guide Tags to Access Database"; Inventors: Sashida, Takanori and Linuma, Kazumoto.

Morganti, Michele and Fdida, Serge; "Multimedia Applications, Services and Techniques" "Lecture Notes in Computer Science"; ECMAST '97, Second European Conference; Millan, Italy; May 1997.

Silverman, Robert; "ESPNet SportsZone Scores Big on Web-Online sports service draws upon a number of content providers for continuous coverage"; 1995, p. 33.

Delphi Moves HQ to New York, Adds 750 Jobs (Delphi Internet Services will move its headquarters from Cambridge to Manhattan, and hire about 750 new employees in MA and NY), May 4, 1995.

"Wink Bridges Interactive TVS, PCS", Multimedia Network Technology Report; No. 24, vol. 2, Dec. 11, 1995.

Hoschika, Phillipp; "Towards a Real-Time Multimedia Web"; Birds of a Feather Session, Minutes from the 4th WWW Conference; Boston, Dec. 12, 1995.

Kumar, Vinay; "Mbone: Interactive Multimedia on the Internet"; New Riders, New Riders Publishing; Indianapolis, Indiana, 1996.

Vetter, Ronald J. and Jonalagada, Christopher; "A Multimedia System for Asynchronous Collaboration Using the Multicast Backbone and the World Wide Web"; The First Annual Conference on Emerging Technologies and Applications in Communications; Oregon Convention Center, May 7-10, 1996, IEEE Computer Society Press. Los Alamitos. CA pp. 60-63.

Mandese, Joe; "Broadcasting, Meet Intercasting", "Intercasting coming to PC screens"; Oct. 23, 1995.

Gibbons, Kent; "Intel, Cable Eye TV, Web Bridge"; Oct. 23, 1995.

Rosenthal, Edmund; "Special to Electronic Media"; Feb. 5, 1996.

Hart, Kenneth; "Group drives net access over TV signals"; Nov. 6, 1995.

"Intel leads Intercast Alliance for Digitized TV Oct. 24, 1995"; Oct. 24, 1995.

"NBC, Intel, Others Hook Up to Offer TV Services via PCs"; Oct. 23, 1995.

"The Online Connection"; Dec. 26, 1995.

"New medium promises to combine television and Internet on home PC"; Dec. 1995, Broadcaster p. 13.

Hart, Kenneth; "Group drives Net access over TV signals"; Nov. 6, 1995, Communications Week International, No. 154, p. 6.

Couches Not Required; Oct. 23, 1995; Media Week, v. 5, n. 40, p. 34.

"Intel Links TV Thru the Net"; Oct. 30, 1995; Electronic Buyer's News, p. 4.

"Three More Operators, GI Join Intercast Effort"; Feb. 26, 1996; Multichannel News, v. 17, n. 9, p. 53.

Frook, John Evan; "Sony Pictures launches areas tied to TV content"; 1995.

Robertson, Jack; "Will TV Industry Grab Piece of Internet Action?"; Electronic Buyer's News, 1996, n. 991, p. 15.

"Broadcaster's Guide"; Intercast, Intel Technology; Intel: Intercast: Viewer 2.0, 1998 Intel Corporation.

Lee Gomes, Knight-Ridder; "System puts Web pages on TVs"; Calgary Herald; Oct. 26, 1995, Thursday; 1995 Southam Inc.

Mandese, Joe; "Intel to Unveil PC System for Interactive TV Viewing"; Electronic Media; Oct. 23, 1995; Crain Communications Inc.

Dziatkiewicz, Mark; "Intercast could reel in more $ for carriers; Intel's New Interact Technology"; America's Network: Dec. 15, 1995, vol. 99, No. 24; p. 23; Advanstar Communications Inc.

Rosenthal, Edmond; "Intercast Partners Gear Up for PC/TV Viewing"; Electronic Media; Feb. 5, 1996, Crain Communications Inc.

Masinter, L.; Irvine, U.C.; Fielding, R. and Berger-Lee, T.; "Uniform Resource Identifiers (URI): Generic Syntax"; Network Working Group: Aug. 1998, pp. 1-33.

Earth Web Releases the Most Advanced Moderated Discussion Product for the Net; PR Newswire: Monday, Jun. 23, 1997.

"New Firm Develops Low-Cost Decoders for Web Transmission"; Mobile Data Report, Nov. 23, 1995, Information Access Company, Capitol Publications, Inc. No. 23, vol. 7, ISSN: 1040-7022.

Intel: Intercast: Toold 2.0; "Installation Roadmap"; 1998 Intel Corporation, Hillsboro, Or.

Fielding, R., et al.; Hypertext Transfer Protocol, Network Working Group Request for Comments: 2068, Jan. 1997.

H'obbes'zakon, Robert; "Hobbes' Internet Timeline v.5.3"; http://www/zakon.org/robert/internet/timeline/.

Hobbes' Internet Timeline.

Mogul, J.; Frystyk, H.; Fielding, R.; Gettys, J.; Berners-Lee, T.; "Hypertext Transfer Protocol-HTTP/1.1"; http//www.ics.uci.edu/pub/ierf/gttp/rfc2068.txt; Jan. 1997, pp. 1-134.

Macedonia, Michael R.; Brutzman, Donald P.; "Mbone Provides Audio and Video across the Internet"; ftp://taurus.cs.nps.navy.mil/pub/mbmg/mbone.html.

Hock-Guan Tan; Adopting TELEVIEW (an advanced photo-video system) for computer based learning actvities; http://cleo.murdock.edu.au/gen/aset/confs/iims/92/sanhg.html; 1992 Promaco Conventions, Mar. 2000.

Wiggins, Richard; "Crawling Info Displays and Slide Shows"; http://www/webhistory.org/www/lists/www.talk.1993q3/1017.html; Mon., Sep. 27, 1993.

Burns, Ed; "Overview of Webcast"; http://www.igd.fhg.de/archive/1995_www95/mbone/webcast-doc.html; Created Mar. 19, 1995, Last Modified Apr. 8, 1995.

Crowcroft, Jon; "Multimedia: Video and Audio Support?"; http://www.cs.ucl.ac.uk/staff/jon/book/node153html; Wed. May 10, 1995.

Andreesen, Marc; "Crawling Info Displays and Slide Shows"; http:www.webhistory.org/wwwlists/www-talk.1993q3/1018.html; Mon., Sep. 27, 1993.

Claveleira, Christian; "Les Applications de Travail Collaboratif"; http://www.cru.fr/multimedia/; Cellule Technique de CRU-03/2001, Nov. 16, 1995.

"Collaborative Document Sharing via the Mbone"; http://www.ncsa.uiuc.edu//SDG/Software/Xmosaic/CCI/webcast-doc.html; Oct. 23, 1998.

"Overview of Webcast"; http://www.ncsa.uiuc.edu//SDG/Software/Xmosaic/CCI/webcast.html; Oct. 23, 1998.

Kumar Vinay; "An FYI: First Mbone Book Available"; http://sauce.uio.no/maill/mbone/1995/1776/html; Sun, Nov. 5, 1995.

Compton, Charles L; Bosco, Paul D.; "Internet CNN Newsroom: A Digital Video News Magazine and Library"; 1995 IEEE; Center for Advanced Engineering Study, Electrical Engineering and Computer Science Department.

Dieberger, Andreas; "Browsing the WWW by Interacting with a Textual Virtual Environment—A Framework for Experimenting with Navigational Metaphors"; Acm, Inc. Hypertext 96: Washington, D.C. 1996; Georgia Institute of Technology, School of Literature, Communication and Culture.

"Using ClassChat"; http://www/sabe.org/samplenetclass/ChatHelp.htm; 1997 Earth Web Inc.

"Earthweb Moderator"; http://scis.nova.edu/Orientation/moderator.html; Last modified May 17, 2001.

"Administrating a Moderator Classroom"; http://www/nova.edufactrain/HowtoModerate.html; Last updated Apr. 30, 1998.

Byous, John; "Java Technology: An Early History"; http://java.sun.com/features/1998/05/birthday.html; Last updated Feb. 8, 2001.

"Server Push-Audio?"; http://goups?h1=en&safe=off7th=26148002a40915e9,6&seekm=D7M2GR.6Rj.9.-S%4Onews.ma; Google Groups: Newsgroups: Newsgroups: Newsgroups: comp.infosystems.www.providers, Apr. 20, 1995.

"Problems with Server Push for Audio"; Google Groups: Newsgroups: comp.infosystems.www.providers, Aug. 21, 1995.

"An Exploration of Dynamic Documents in Netscape 1.1"; http://home.netscape.com/home/demo/1.1bl/pushpull.html; Apr. 12, 2001.

"Server Push with Real Audio"; Newsgroups: comp.infosystems.www.authoring.cgi; Oct. 7, 1995.

Thierry, Michel; "Synchronized Multimedia"; W3C User Interface Domain; 200 (Mar. 22, 2001).

Wiggins, Rich; "Re: Crawling Info Displays and Slide Shows"; http://www.webhistory.org/www.lists/www-talk1993q4/0030.html; Sun, Oct. 20, 1993.

"Technology, Tools and Applications: Remote Conference Sites" Third International World-Wide Web Conference: http://www.igd.fng.de/archive/1995_www95/mbone/remote_sites. html; Apr. 10-14, 1995, Darmstadt, Germany.

"Technology, Tools and Applications: Notes for Presenters at Multicast Sessions" Third International World-Wide Web Conference: http://www.igd.fng.de/archive/1995_www95/mbone/remote_sites.html; Apr. 10-14, 1995, Darmstadt, Germany.

Burns, Ed; "CCI for Perl:webcast 1.1a4 available"; http://www/hypernews.org/HyperNews/get/www/cciPerl/35.html; May 18, 1995.

Zawinski, Jamie; "Remote Control of UNIX Netscape"; http://home.netscape.com/newsrerf/std/x-remote.html; Dec. 1994.

Kumar, Vinay; http://proxy.belnet.be/packages.mbone/set/www/shared-mosaic/README-Shared-Mosaic; Aug. 18, 1994.

Burns, Ed; "WEBCAST Main Page"; http://www/ncso.ufuc.edu/SDG/Software/Xmosaic/CCI/webcast.3n.html; Last updated: Oct. 23, 1998.

Braverman, Alan; "CCI Slide Show"; http://www.nsco.uluc.edu/SDG/Software/Xmoxaic/CL/cc-slide-show.html; Sep. 22, 1994.

Andreessen, Marc; "Using Mosaic b Remote Control" http://www/webhistory.org/www/lists/www-talk.1993q2/0447.html; Fri. Jun. 11, 1993.

"Collaborative document sharing via the MBONE"; http://www.ncso.uluc.edu/SDG/Software/Xmosaic/CCI/webcast.html; last updated Oct. 23, 1998.

Learn-Ed Deliverable 6: "Preliminary Service Specifications (Draft)"; Dec. 31, 1996.

Learn-Ed Deliverable 9; "Service Specifications (Draft)"; http://titan.mic.dundee.oc.uk/projectpages/LEARNEDDels/deliverable9/Contents.htm; Dec. 31, 1996.

In the Matter of *ACTV, Inc.* v. *The Walt Disney Co.*: Deposition of Jason M. Palmer, Mar. 13, 2002.

In the Matter of *ACTV, Inc.* v. *The Walt Disney Co.*; Deposition of Shelton L. Palmer, Mar. 14, 2002.

*ACTV, Inc. and HyperTV Networks, Inc.* v. *The Walt Disney Co., ABC, Inc. and ESPN, Inc.*: Civil Action No. 00 CIV 9622 (JSR) Notice of Subpoena to Jason M. Palmer, Sep. 28, 2001 (Exhibit 1 to Deposition of Jason M. Palmer, Mar. 13, 2002).

In the Matter of *ACTV, Inc.* v. *The Walt Disney Co.*: Series of notebook pages bearing Bates Nos. DR 01924-58 (Exhibit 3 to Deposition of Jason M. Palmer, Mar. 13, 2002).

*ACTV, Inc. and HyperTV Networks, Inc.* v. *The Walt Disney Co., ABC, Inc. and ESPN, Inc.*: Declaration of Jason M. Palmer, Nov. 28, 2001 (Exhibit 4 to Deposition of Jason M. Palmer, Mar. 13, 2002).

*ACTV, Inc. and HyperTV Networks, Inc.* v. *The Walt Disney Co., ABC, Inc. and ESPN, Inc.*: Declaration of Shelton L. Palmer, Nov. 28, 2001 (Exhibit 5 to Deposition of Jason M. Palmer, Mar. 13, 2002).

Single Sheet Bearing Bates No. DR 1959 (Exhibit 6 to Deposition of Jason M. Palmer, Mar. 13, 2002).

Document Titled: "WebPager—Automatic Access With Existing Technology", Oct. 10, 1995 (Exhibit 7 to Deposition of Jason M. Palmer, Mar. 13, 2002).

Documtent Titled: "WebPager Provisional Patent Modifications", Oct. 6, 1996 (Exhibit 9 to Deposition of Jason M. Palmer, Mar. 13, 2002).

*ACTV, Inc. and HyperTV Networks, Inc.* v. *The Walt Disney Co., ABC, Inc. and ESPN, Inc.*: Declaration of Jason M. Palmer, Feb. 14, 2002 (Exhibit 10 to Deposition of Jason M. Palmer, Mar. 13, 2002).

Fax Transmittal Cover Sheet from Alex M. Lipking to Shelly Palmer, May 10, 2001, and Letter from Disney Enterprises, Inc. to Shelton L. Palmer Re: Consulting Agreement and Related Patent Transaction, May 10, 2001 (Exhibit 11 to Deposition of Jason M. Palmer, Mar. 13, 2002).

Letter from Disney Enterprises, Inc. To Shelton L. Palmer Re: Consulting Agreement and Related Patent Transaction, May 10, 2001 (Exhibit 12 to Deposition of Jason M. Palmer, Mar. 13, 2002).

Agreement for Professional Services, by and between Disney Enterprises, Inc., a Delaware corporation, and SLP Productions, Inc. a New York corporation, with respect to the services of Shelton L. Palmer, Jul. 9, 2001 (Exhibit 13 to Deposition of Jason M. Palmer, Mar. 13, 2002).

The Walt Disney Company Check No. 00676752 payable to SLP Production, Inc. in the amount of $650,000, Jul. 26, 2001 (Exhibit 14 to Deposition of Jason M. Palmer, Mar. 13, 2002).

*ACTV, Inc. and HyperTV Networks, Inc.* v. *The Walt Disney Co., ABC, Inc. and ESPN, Inc.*: Civil Action No. 00 CIV 9622 (JSR) Notice of Subpoena to Shelton Leigh Palmer, Sep. 28, 2001 (Exhibit 16 to Deposition of Jason M. Palmer, Mar. 13, 2002).

Document Titled: "WebPager—Automatic Access With Existing Technology", Oct. 26, 1995 (Exhibit 17 to Deposition of Jason M. Palmer, Mar. 13, 2002).

*ACTV, Inc. and HyperTV Networks, Inc.* v. *The Walt Disney Co., ABC, Inc. and ESPN, Inc.*: Declaration of Shelton L. Palmer, Feb. 14, 2002 (Exhibit 18 to Deposition of Jason M. Palmer, Mar. 13, 2002).

Letter Agreement, by and among Disney Enterprises, Inc., SLP Productions, Inc., Sheton L. Palmer, Jul. 20, 2001 ( Exhibit 19 to Deposition of Jason M. Palmer, Mar. 13, 2002).

Letter Agreement, by and among Disney Enterprises, Inc., WebPager, Inc., SLP Productions, Inc., Shelton L. palmer and Jason M. Palmer, Jul. 20, 2001 (Exhibit 20 to Deposition of Jason M. Palmer, Mar. 13, 2002).

Authorization Letter from WebPager, Inc. authorizing payments to SLP Productions, Inc., Jul. 17, 2001 (Exhibit 21 to Deposition of Jason M. Palmer, Mar. 13, 2002).

*ACTV, Inc. and HyperTV Networks, Inc.* v. *The Walt Disney Co., ABC, Inc. and ESPN, Inc.*: Expert Report of David B. Lockton, Jun. 11, 2001.

Interactive Network Brochure for the IN Control Unit (Exhibit A to Expert Report of David B. Lockton, Jun. 11, 2001).

Curriculum Vitae of David B. Lockton (Exhibit B to Expert Report of David B. Lockton, Jun. 11, 2001).

*ACTV, Inc. and HyperTV Networks, Inc.* v. *The Walt Disney Co., ABC, Inc. and ESPN, Inc.*: Declaration of Immanuel Freedman, Nov. 28, 2001.

*ACTV, Inc. and HyperTV Networks, Inc. v. The Walt Disney Co., ABC, Inc. and ESPN, Inc.*: Expert Report of Immanuel Freedman, Jun. 11, 2001 (Exhibit 1 of the Declaration of Immanuel Freedman, Nov. 28, 2001).

Business Wire, Inc. Business Wire Re: Formation of Industry Group to promote new digital medium for the Home PC; Intercast Medium combines the digital power of the PC, the Global Interactivity of the Internet and the Rich Programming of television, Monday, Oct. 23, 1995 (Exhibit K of the Expert Report of Immannuel Freedman, Jun. 11, 2001).

The Second International WWW Conference 94, Mosaic and the Web, Advance Proceedings, vol. 1, Combining WWW/Mosaic with Realtime Multimedia Conferencing in Distance Education, Oct. 17-20, 1994 (Exhibit L of the Expert Report of Immanuel Freedman, Jun. 11, 2001).

The Second Internationl WWW Conference 94, Mosaic and the Web, Advance Proceedings, vol. 1, A Synchronous Collaboration Tool for the World-Wide Web, Oct. 17-20, 1994 (Exhibit M of the Expert Report of Immanuel Freedman, Jun. 11, 2001).

Third Workshop on Enabling Technologies: Infrastructure for Collaborative Enterprises, Sponsored by IEEE Computer Society, with support from AAA1, In cooperation with ACM Sigois, Hosted by The Concurrent Engineering Research Center at West Virginia Unviersity, Apr. 17-19, 1994 (Exhibit N of the Expert Report of Immanuel Freedman, Jun. 11, 2001).

Exemplary Claim Chart for Claim 1 of the '664 Patent and Palmer '865 (Exhibit S of the Expert Report of Immanuel Freedman, Jun. 11, 2001).

Exemplary Claim Chart for Claim 1 of the '181 Patent and Palmer '865 (Exhibit T of the Expert Report of Immanuel Freedman, Jun. 11, 2001).

Exemplary Claim Chart for Claim 1 of the '664 Patent and Dybvik Paper (Exhibit U of the Expert Report of Immanuel Freedman, Jun. 11, 2001).

Document demonstrating the public availability of the software of the system disclosed in the Dybvik Paper in 1994 (Exhibit 2 to the Declaration of Immanuel Freedman, Nov. 28, 2001).

Exemplary Claim Chart for Palmer References (Exhibit 3 to Declaration of Immanuel Freedman, Nov. 28, 2001).

Investor's Business Daily, front page, p. A9, and other page of vol. 12 No. 137 1995, Tuesday, Oct. 24, 1995.

Document Titled: "Interactive television 1996, The University of Edinburough 305 Sep. 1996."

Internet Marketing Discussion list archive: Intercast Introduced, Monday, Oct. 23, 1995; http://www.i-m.com/October-22-31-1995/oo17.html.

Computer Aided Technologies, The Intercaster, May 1998 vol. 1.1; http://nam.quicknet.com/amintercast.com/index.htm.

FAQ of The Intercast Industry Group.

Interactive TV Trials, Video On Demand and Settop Trials; http://www.telport.com/~samc/cable4.html.

CNET Coverage: Intercast technology bring TV to your PC; http://coverage.cnet.com/Content/Features/Techno/Intercast/index.html.

A Synchronous Collaboration Tool for World-Wide Web; Tak K. Woo; Michael J. Rees;Distribution Systems Technology Centre; The University of Queensland; Queensland 4072; http://www.ncsa.uluc.edu/SDG/IT94/Proceedings/CSCW/rees/SynColtol.html.

A Synchronous Collaboration Tool for World-Wide Web; Tak K. Woo, Michael J. Rees; Distribution Systems Technology Centre, The University of Queensland; Queensland 4072.

Supplier No. 19203632; Interactive television (intercast standard)(Technology Information); Hogan, Mike; Polito, Julie; Grech Christine; Schwerin, Rich; Schwerin, Wendin, PC Computing, v10, n4, p. 38(1) Apr. 1997.

PC Magazine: PC Tech, Intercast Brings the Web to TV; http://home.zdnet.com/pcmag/pctech/content/16/02/irl602.002.html.

Microsoft Digital television: Using Analog to Deliver Digital: The VBI; http://www.microsoft.com/drv/del_art_vbiol.htm.

Article Review 1: Intercast brings Web to TV; http://opim.wharton.upenn.edu/~opim314/spring97/article1/article1/review1-leu.html.

Norpak—Article 1: VBI Data Broadcasting; http://www.vpi.ru/Vbiteche.htm.

Vedro; info.p@cketszno.32, Dec. 1997; Beyond the VBI—High Speed Datacasting and Enhanced TV, By Steven Vedro; http://www.cpb.org/testarea/library/inforpackets/packet32.html.

Parliament of Australia, Parliament Library; Bill Digets No. 179 1997-98; Datacasting Charge (Imposition) Bill 1998; http://www.aph.gov.au/library/pubs/bd/1997-98/98bd179.htm.

The TextGrabber; VBI Video Decoding System; http://www.unite.com/textgrab.html.

Intercast Industry Group Member List—Steering Committee Members; http://www.intercast.org/iig.iigsteer.htm.

Intercast Industry Group Member List—Associate Members; http://www.intercast.org/iig.iigassoc.htm.

Intel.com Content Producer; http://www.intel.com/intercast/developer/content/who.htm.

CNET Special Reports; Intercast Technology brings TV to your PC; http://vvww.cnet.com/Content/Features/Techno/Intercast/graphic.html.

International Messaging Associates; IEFT 1995 Archives; Re: New intercast medium announced; http://mlarchive.ima.com/ietf/1995/2827.html.

Business Wire, Inc. Business Wire Re: Formation of Industry Group to promote new digital medium for the Home PC; Intercast Medium combines the Digital Power of the PC, the Global Interactivity of the internet and the Rich Programming of television; Monday, Oct. 23, 1995.

International Search Report of Jan. 15, 2003 and references cited therein and not previously forwarded to USPTO.

Batchelor, Steve; Throckmorton, John; "Intercast-enabling a Mainstream Broadcast Medium for the Personal Computer"; The First Annual Conference on Emerging Technologies and Applications in Communications, "Proceedings"; IEEE Computer Society Press; Los Alamitos, California; pp. 176-177.

"Mbone Provides Audio and Video across the Internet"; ftp://taurus.cs.nps.navy.mil/pub/mbmg/mbone.html.

Li Q, et al.; "XML based text TV"; Proceedings of the International Conference on Web Information Systems Engineering; Proceedings of WISE 2000, XX, XX; Jun. 19, 2000; pp. 109-113. XP002192977.

U.S. Appl. No. 09/860,259, filed May 18, 2001; "Apparatus and method of automatically accessing on-line services in response to broadcast of on-line addresses;" Inventor: Palmer, et al.

U.S. Appl. No. 60/008,111, filed Oct. 30, 1995; "Automatic WWW access existing technology;" Inventor: Palmer.

http://www.neoreality.com/crew/stuff/pic-action-quake2.htm;

Quake 2; Scoreboard Jul. 18, 1995.

Gamespy Tutorial; http://www.gamespy3d.com/using/smart.shtml.

Partial International Search Report issued Nov. 5, 2002.

U.S. Appl. No. 08/735,706, filed Oct. 23, 1996; "Television transmitter, television transmitting method, television receiver and television receiving method;" Inventors: Ota, Jun; Kisanuki, Chisata; Nishioka, Hisao; and Enomoto, Takaoki.

U.S. Appl. No. 597,432, filed Feb. 8, 1996; "Media online services access via address embedded in video or audio program;" Inventor: Thomas R. Wolzien.

Canadian Patent Database; filed on Sep. 1, 1998; Inventor: Hicks, John A III; Appl. No. CA 2246023; "Internet linkage with broadcast TV."

* cited by examiner

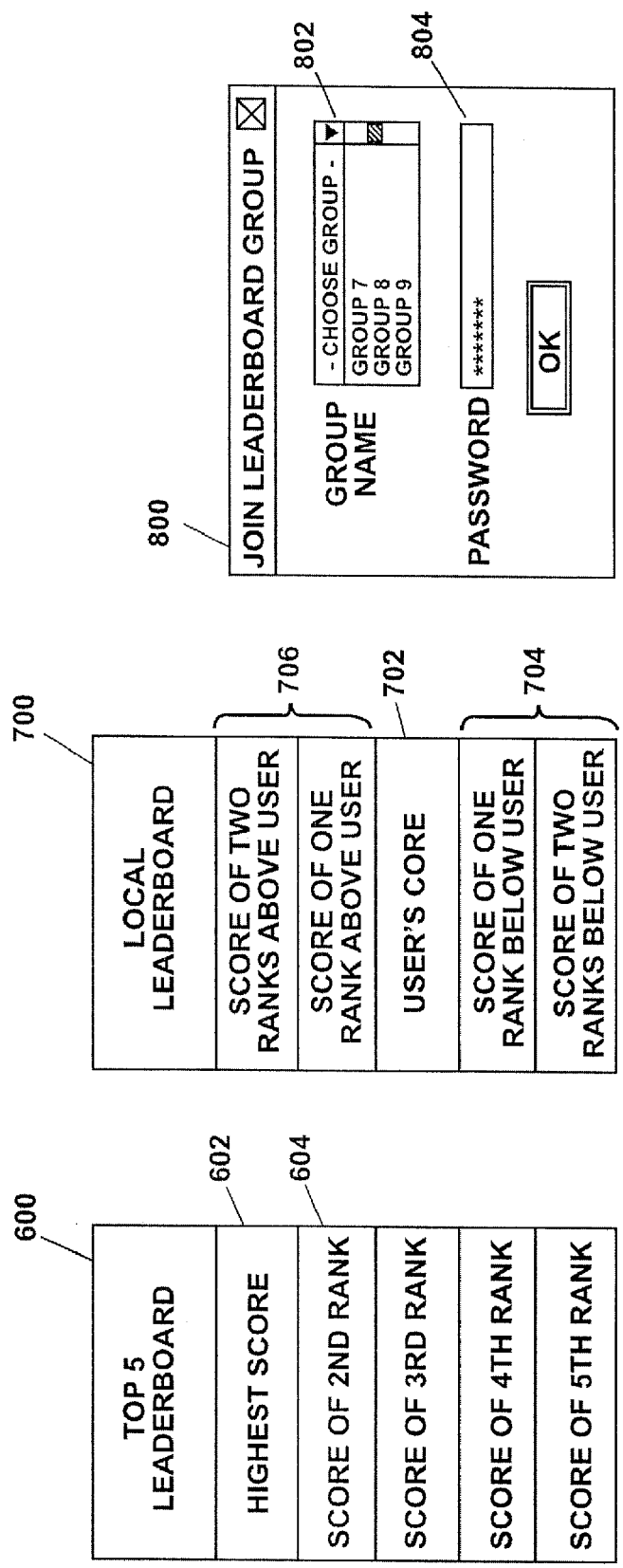

SYSTEM AND METHOD FOR ENHANCED BROADCASTING AND INTERACTIVE TELEVISION

This application is a continuation of U.S. patent application Ser. No. 09/706,055, entitled "System and Method for Enhanced Broadcasting and Interactive Television," filed on Nov. 3, 2000 now U.S. Pat. No. 7,409,700, the contents of which are hereby incorporated by reference in its entirety.

FIELD OF THE INVENTION

Background of the Invention

Television has long been enjoyed in our society as a means for delivering information for the enhancement of knowledge as well as for delivering content with entertainment value. In all of its uses, however, television has remained a one-way experience for the viewer, wherein viewers do not have the opportunity or ability to interact with the content of a television broadcast. In fact, television has in many cases been criticized for simply "feeding" broadcast material to viewers without requiring any thought, participation, or feedback from the viewers. For these reasons, television is often regarded as having a deleterious effect on the development of children's communication skills and thought processes.

Television Journalist Edward R. Murrow said in TV Guide, December, 1958, This instrument can teach, it can illuminate; yes, and it can even inspire. But it can do so only to the extent that humans are determined to use it to those ends. Otherwise it is merely light and wires in a box." Indeed, nearly half a century later, utilizing television for educational purposes continues to be an area to which much attention is focused. Many of today's television programs are geared toward educational purposes, schools use televisions as educational tools, and classes can even be taught television networks. Yet even with the all the effort to utilize television as an educational tool, television remains a one-way experience for a viewer, continuing to charm "couch potatoes" the world over. The criticism remains that television dulls the mind through its inability to provide an interactive environment for viewers.

While television remains devoid of interactive experiences, the potential of interaction between multiple persons has been greatly heightened in recent years due to the popularity of the Internet. The Internet provides a powerful network for exchanging content, messages, and user inputs, enabling various users to achieve a level of interaction that was previously unknown. However, this interaction is typically limited to individual instances, making large broadcast interactive experiences impossible. The camaraderie generated by post-broadcast discussions amongst viewers who witnessed the same show simply is not available to computer users who engage in unique interactive sessions not experienced by the number of users typically reached by a television broadcast. Furthermore, this interaction has been constrained to the realm of computers, and there remains a lack in the technology for providing systems which allow or support viewer interaction and participation in television programming.

Many recent prior art television based systems have attempted to address the need for interactivity between television and its viewers. U.S. Pat. No. 4,926,255 by Von Kohorn discloses a system wherein users can individually answer questions related to a television broadcast, and receive information as to the accuracy of their answers. However, Von Kohorn does not provide the ability for users to interact with one another during a television broadcast such as by competing against each other and receiving relative scores. Conversely, the prior art system of U.S. Pat. No. 5,343,239 by Lappington, et al., teaches a system that has the capability to store a plurality of audience scores at a central location. However, Lappington requires each user to manually deliver his individual result to the central location, and further fails to disclose a method for comparing the plurality of results for purposes of ranking or scoring the users relative to one another. Thus, no direct interaction is available. U.S. Pat. No. 5,013,038, by Luxenberg, et al., does disclose a system that enables remote users to compete relative to one another. However, this system requires individual users to telephone a central system for entering their respective results, and provides relative scoring for only a small, statistically selected group of users.

Thus, none of these prior art systems enables remote users to interact with or to compete with each other relative to a television program, to receive relative scoring for the entire group of remote users, or to receive relative scoring for any customized user-selected subgroup of users. Furthermore, none of these systems specifically provides for the integration of Web content with traditional television broadcasting.

More recently, television-integrated Web access has become known in the art. However, these later systems generally continue to fail to provide interactive capabilities for the user to communicate with the content of the television program. These systems operate by controlling a user's web browser to automatically retrieve web pages during the time of a television broadcast. However, these systems only deliver website addresses (URLs) to a user and do not allow for the involvement of the user in the broadcast content. They merely provide supplemental content to be read, viewed, or heard during a television broadcast. Consequently, there is not currently a means for a television viewer to enjoy an interactive experience with the content and timeline of a television broadcast or with other viewers.

SUMMARY OF THE INVENTION

The invention seeks to provide television audiences with the possibility for viewer participation in a television broadcast through interaction with the broadcast content. The present invention utilizes a delivery network, such as the Internet, for delivering television broadcast "enhancements" to a viewer, such that the viewer may not only watch a television program, but also can participate in and enjoy a previously unknown interactive experience with the content and timeline of that program. The interaction of the present invention can either be driven exclusively client-side or require client-server interaction.

In the exclusively client-side interaction feature of the present invention, the user receives information from a broadcast and is not required to return information to a broadcaster or to any other remote location. Instead, a custom software application is placed on the user's computer to act as an interface and to facilitate the interactive experience locally. Thus, the interactivity occurs client side, in contrast to prior art interactivity which requires users to interact directly with the server.

The client-server interaction feature of the present invention does require users to communicate directly with the server. However, this form of interaction enables users to alter content of a broadcast in progress. The client-server interaction enables a broadcaster to utilize and respond to user input, as by altering or creating broadcast content in direct response to users' inputs to the server. For example, users can participate in a football game as it is broadcast on television by providing predictions, requests or suggestions to a broadcaster server computer during the television game broadcast. Producers, broadcasters, coaching staff, or others involved with the football game will receive this users' input, consider it, and be influenced to change the course of the game or the manner in which it is being broadcast. Thus, users of systems of the present invention are provided with a venue for direct participation in live events as they are broadcast on television.

Embodiments of the present invention utilizing either form of interaction describe above both feature synchronized timing characteristics. The enhancements used to enhance television programming are related to the television broadcast content and are synchronized in time with the television broadcast. The resulting effect is one of interaction with the television broadcast in a realistic, time-sensitive setting.

Embodiments of the present invention also enable users to compete with each other, either against the totality of all users or against only a subset of users. In the latter case, the subset of users may be pre-defined or, alternatively, may be customized and selected by one user.

The foregoing and other objects, features, and advantages of the present invention will become apparent from a reading of the following detailed description of exemplary embodiments thereof, which illustrate the features and advantages of the invention in conjunction with references to the accompanying drawing Figures.

BRIEF DESCRIPTION F THE DRAWINGS

FIG. 6 illustrates a score leaderboard exemplary of one feature of the present invention;

FIG. 7 illustrates an alternative version of a score leaderboard exemplary of a different feature of the present invention; and FIG. 8 is an exemplary data entry dialogue box for customizing yet another version of an alternative score leaderboard, illustrative of yet another feature of the present invention.

DETAILED DESCRIPTION OF THE INVENTION

In the following description of the exemplary embodiments of the present invention reference is made to the accompanying drawings which form a part thereof, and in which are shown by way of illustration specific embodiments in which the invention may be practiced. It is to be understood that other embodiments may be utilized and structural and functional changes may be made without departing from the scope of the present invention.

As used herein, the term' "message" may be used, but is not limited, to describe a segment of code that is received, analyzed, and rendered by a software application. In the exemplary embodiments described herein, messages are embodied as "code fragments." However, it is to be understood that the invention is directed to "messages" in a broader sense, wherein a message representing an enhancement can be any of a number of forms, and is not limited to the exemplary code fragment embodiment. Unlike "triggers," which are used in Advanced TV Enhancement Forum (ATVEF) standard applications, the code fragments of the present invention do not contain uniform resource locators (URLs). In contrast, the code fragments are specific instructions to an application or an Dynamic Hypertext Markup Language (DHTML) document resident and executable on a computer to which the code fragments are delivered. For example, a software application may receive a code fragment written in JavaScript, evaluate it using a resident JavaScript interpreter, causing a side effect in the document object model (DOM) which causes the DHTML document to be re-rendered within the HTML-enabled browser. Essentially, a screen display that is "visually described" by HTML code may have a portion of it change upon receipt of a code fragment that will cause replacement of only a portion of the entire screen's descriptive HTML code.

Additionally, the term "applets" is used to describe small applications that are delivered from a server to a client over a computer network. Applets, which may or may not be written in the Java computer language, are resident and functional at the client-side, but typically cannot be run without a browser or an applet viewer.

Figure 1:
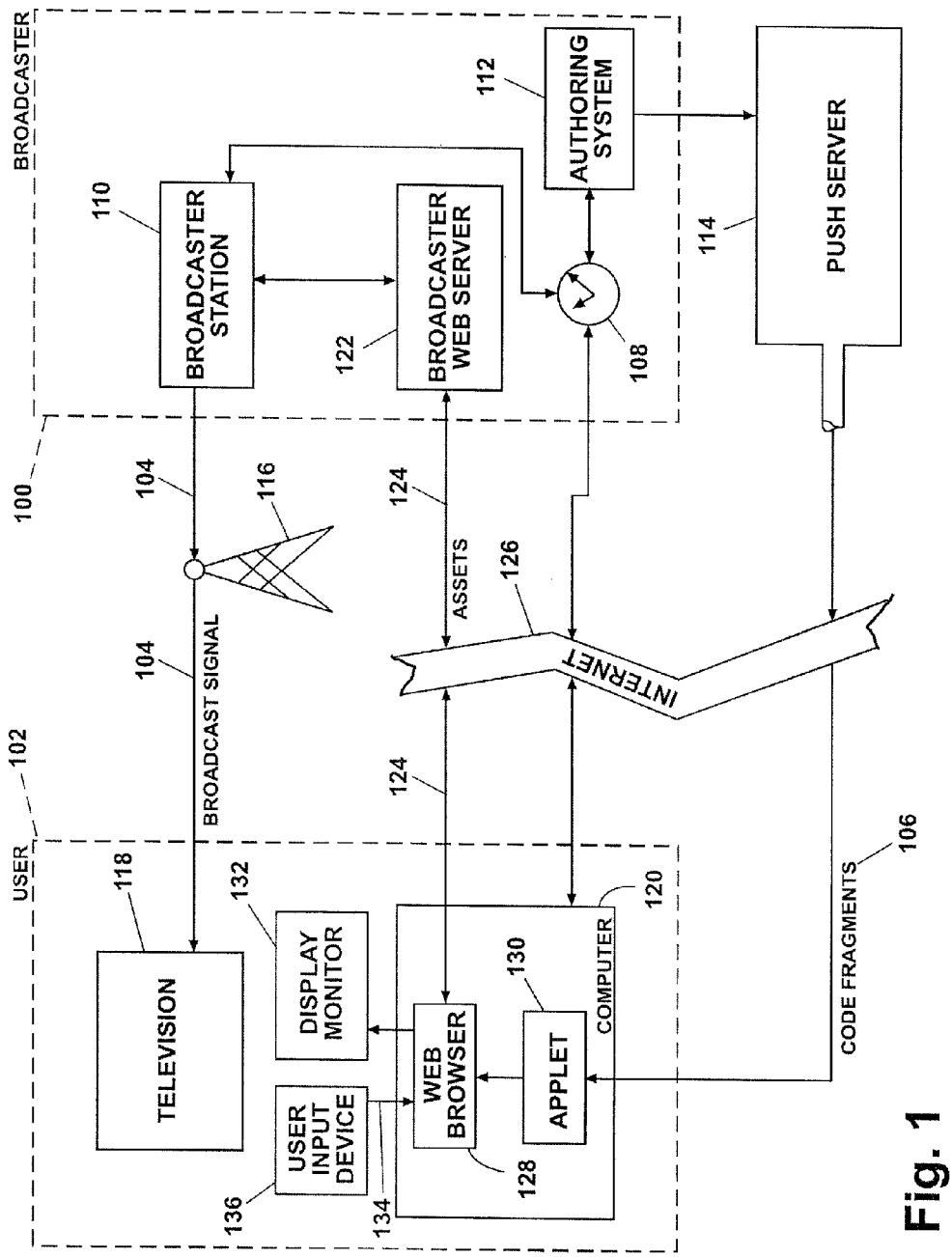
FIG. 1 illustrates an enhanced broadcasting system according to an embodiment of the invention.

As illustrated in FIG. 1, one embodiment of the system of the present invention is employed by a broadcaster 100 to deliver enhanced broadcasting to its audience 102. In the exemplary enhanced broadcasting system, enhancements are delivered to users in the form of code fragments. The enhancements are designed to be correlated to content of television broadcasts. For example, enhancements for a televised football game could involve descriptions of football players, statistics, strategy planning, etc. for users at home. Enhancements for a televised quiz game show could involve quiz questions and scoring opportunities for users at home.

Enhancements are also correlated to television broadcasts with respect to time. In the case of pre-recorded automatic playback, an audio and video signal, such as a television signal, 104 is synchronized to related enhancements (served as code fragments) 106 with respect to a house clock 108, The house clock 108 is so named because it is utilized internally by the broadcaster 100 to synchronize timing at both the broadcaster station 110 and a broadcaster authoring system 112, which is used to create code fragments 106. House clock 108 is also used to synchronize a push server 114, used to efficiently deliver code fragments 106 from authoring system 112 to a plurality of users 102. The house clock 108 may be, for example, the Greenwich atomic clock, a cesium oscillator, or a GPS receiver, all commonly used standards for precision time synchronization. While the description herein continues with references to house clock 108 as utilized for pre-recorded automatic playback, it is to be understood that the present invention also may be used in the context of live broadcasts. In this case, house clock 108 is not used to synchronize client computer 120 or authoring system 112. Instead, code fragments 106 are sent at the appropriate times relative to the live broadcast, and interpreted at the client side "as soon as possible." That is, code fragments 106 are sent and interpreted in real-time, concurrent with the live broadcast transmission.

Broadcaster authoring system 112 is contemplated, within the teachings of the present invention, as being computer-executable software that enables broadcaster 100 to create code fragments 106 for the purpose of enhancing the content of a particular broadcast. The software may include a word processor, a programming compiler, or other standard means of text entry. The software may also include communication with an external media player, or include its own media player, for the purpose of pre-playing a broadcast to assist in the development of appropriate and related code fragments.

In accordance with the teachings of the present invention, the software is automated, such that a user of the authoring system can select a point in time during the broadcast, indicate the preferred contents of the code fragment, and instruct the software to automatically produce a line of code descriptive of the indicated contents and including a time stamp for linking to the selected point in time. Also, the code fragments developed with the authoring system can be created and pushed down manually, as is the case in a live-broadcast scenario in which messages are developed and delivered in real time.

For ease of use, the broadcast authoring software features the use of templates. Templates capture the structure of a message, having data fields representing each component portion of the message. Certain fields are pre-defined, and the additional fields are filled in by the authoring system 112 as a user supplies the necessary information. Authoring system 112 then extracts the data from the data fields, and assembles the message. In the exemplary embodiment, the message is a code fragment. Once rendered and viewed by a user at the client side, a completed code fragment represents an "enhancement." By pre-defining commonly used messages, such as code fragments or components thereof, and making them available as templates, users of authoring system 112 need only enter limited information to complete construction of a code fragment.

For example, to create enhancements for supplementing a television game quiz show broadcast, a question/answer template is utilized by authoring system 112. The template is pre-defined as to size, shape, appearance, placement, and other attributes that will define the question/answer enhancement's appearance on a computer screen when the template is rendered by Web browser software. The template lacks, however, substantive content describing any particular question or answer. Users of authoring system 112 supply the empty data fields of the template, through their computer keyboard or other input device, with a question and a set of multiple choice answers to appear in an enhancement. While doing so, the rendered question/answer enhancement is displayed on a portion of the screen such that it continually updates according to the information being supplied by the user. In this way, the user can visualize the end-product enhancement while he is in the process of modifying the code of a template for creating the completed code fragment that will describe the end-product enhancement.

Once received by client computer 120, code fragments 106 are processed in any of a number of ways. For example, code fragment 106 may act at client computer 120 to set or change an internal controlling state variable which would cause a presently displayed DHTML document to be re-rendered within Web browser 128. Alternatively, code fragment 106 can cause Web browser 128 to fetch a new DHTML document, or Web page, and to extract data from the fields of code fragment 106 to dynamically create and display the fetched DHTML document. Still another function of code fragment 106 is to cause a side effect, changing the DOM, which causes the currently displayed DHTML document to be re-rendered. In all cases, once the re-rendering or fetching of the DHTML document is triggered, other information within the data fields of code fragments 106 is gleaned and utilized to construct the DHTML document, thereby providing updated and continually evolving enhancements.

A complete code fragment is generated by the broadcaster authoring software, as described above, using a combination of the information in the pre-defined template and the information supplied by the user. The software also includes access to a database or other type of data storage. Utilizing the software, users of authoring system 112 can create code fragments 106, associate them with time-stamps indicative of requested delivery time, and store them for future delivery during a particular broadcast show.

In accordance with the teachings of the present invention, user 102 is able to simultaneously enjoy broadcast 104, which is delivered through standard broadcasting means 116 and on a receiver such as a television 118, and to interact with the broadcast enhancements on a separate receiver, such as a computer 120. The broadcaster houses Web server 122 which serves assets 124 of DHTML documents or Web pages, related in content to broadcast 104. In the exemplary embodiment illustrated in FIG. 1, assets 122 are served to individual users, or viewers, over a communications network such as the Internet 126. The user's computer 120 houses a web browser 128 and a customized software application, such as applet 130. Applet 130 is embedded in DHTML document 200, where it receives code fragments 106 via computer network 126. DHTML document 200 and applet 130 are executable by Web browser 128, such that code fragments 106 are interpreted and rendered therein. Each code fragment 106 describes only a portion of a larger image, causing the display of web browser 128, which appears on computer monitor 132, to be modified or updated upon receipt of each code fragment.

In an embodiment of the present invention, DHTML document 200 comprises a top level frame set, as commonly utilized in the art. Applet 130 is embedded in DHTML document 200 in a hidden frame. Thus, when embedded applet 130 receives code fragments 106, code fragments 106 are evaluated in the context of the top level frame set of DHTML document 200.

Figures 2, 3:
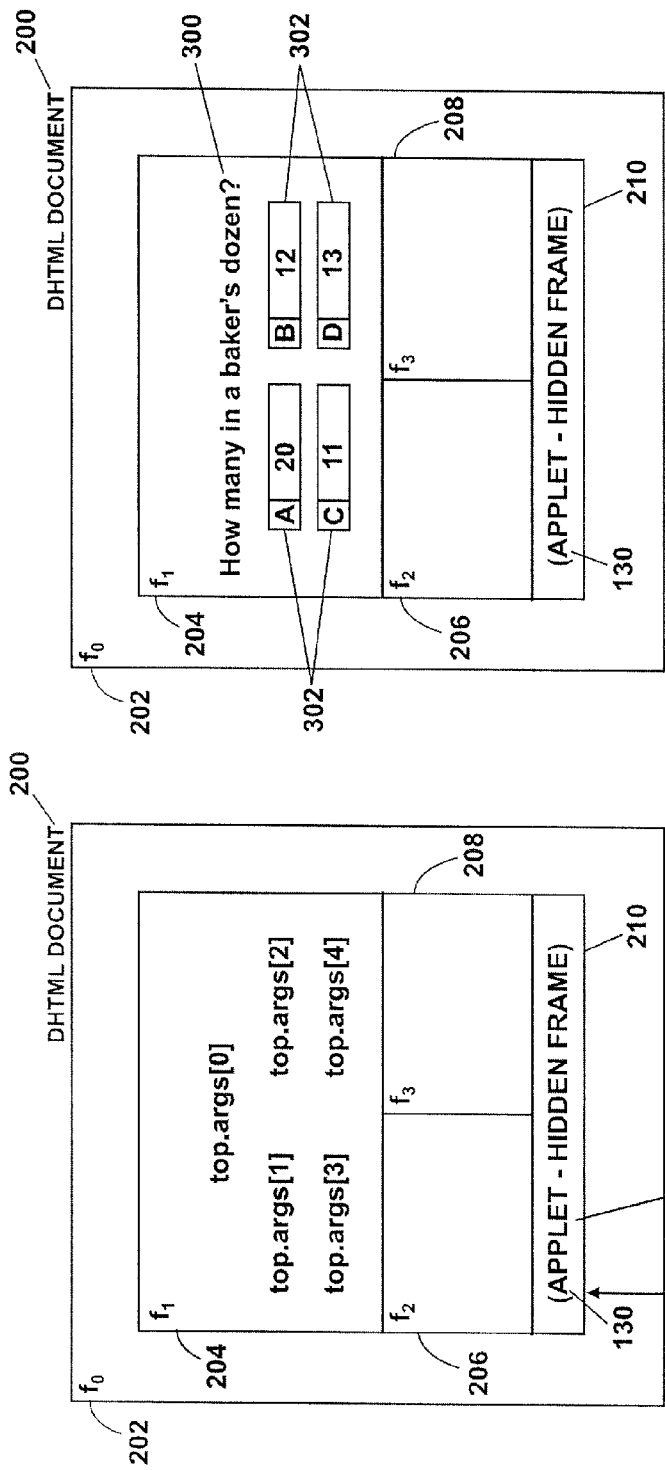
FIG. 2 illustrates an exemplary DHTML document layout according to an embodiment of the present invention.
FIG. 3 illustrates an exemplary DHTML document, after receiving a code fragment input, according to an embodiment of the present invention.

FIG. 2 and FIG. 3 illustrate an exemplary layout for a DHTML document 200 with embedded applet 130. FIG. 2 illustrates an exemplary layout of various frames within DHTML a top-level frame $f_0$ 202 and encloses several lower level frames: $f_1$ frame 204, $f_2$ frame 206, $f_3$ frame 208, and a hidden frame 210. $f_1$ frame 204 can receive a question HTML template designed to present a question and four possible answers to users of a system according to the present invention. The question HTML template includes an array or a table which is populated by elements of code fragments as they are received by Applet 130. Applet 130 resides in hidden frame 210 and receives code fragments 106 from push server 114, indicated at arrow 218. Applet 130 then analyzes, or evaluates, code fragments 106, as indicated at arrow 220 and explained in more detail below.

Exemplary code fragment 212 comprises an identifier 214 and five arguments 216 to populate the array or table of the question HTML template within $f_1$ frame 204. When applet 130 receives code fragment 212, identifier 214 indicates how the remaining arguments 216 will be analyzed. Applet 130 serves the received code fragment 212 to a JavaScript interpreter, where a handler, designed to process a particular type of message, process code fragment 212 according to its message type. Code fragment 212 is accordingly served to Web browser 128. In this exemplary scenario, identifier 214 is the letter, "q." The handler contains code that, in case "q," causes a "question template" HTML document to be populated by the remaining five arguments 216 of code fragment 212 and placed $f_1$ frame 204. The result of this population is shown in FIG. 3 where $f_1$ frame 204 presents to a user the question 300 and four possible answers 302 that were contained in as the last five arguments 216 and could fragment 212.

It is to be understood that DHTML document 200 can contain any number of frames, organized in any manner, and that each of the frames can contain any HTML, or other, template. Code fragments can contain any number or type of arguments, and applet 130 can evaluate code fragments in any of a number of standard methods known in the art. The selection of templates for placement within different frames can be controlled with the use of identifiers recognized by an applet as explain herein, or by any other means that will be apparent to those skilled in the art.

In addition to responding to code fragments received over the Internet to Web browser 128, DHTML document 200 also functions through direct audience participation. User 102 participates with broadcast 104 and Web content 124, 106 by providing input 134 to his computer through a user input device 136, such as a keyboard, mouse, microphone, or other peripheral device. DHTML document 200 recognizes and analyzes user input 134, which is rendered by Web browser 128 and displayed on monitor 132.

Also supporting the interactive experience of the present invention is the added feature of synchronization, which ensures that the content displayed on the user's computer 120 is timed according to the content displayed on television 118. Synchronization can be achieved in a variety of different ways. These can include real-time delivery methods and Network Time Protocol (NTP) methods, though those skilled in the art will appreciate that alternative synchronization protocols are within the scope of the present invention.

In a real-time delivery embodiment, code fragments 106 are delivered to users according to the times they are to be viewed by the users. In this embodiment, a user's client-side computer 120 will receive and render a code fragment immediately upon delivery.

In an alternate embodiment, code fragments 106 include time stamps. In this embodiment synchronization is achieved, for example, by NTP. This embodiment is more reliable than the previously disclosed embodiment in cases where delivery times of code fragments are uncertain. Such uncertainties can arise, for example, from network congestion or low quality network service provided to users. NTP entails synchronizing the client's application clock to "global time." Global time is, in the exemplary embodiment shown, determined by house clock 108. Code fragments 106 sent to each user's computer (client computer) 120 are time-stamped according to global time, and each client computer 120 evaluates the code fragments based on the code fragment's synchronized application clock. The code fragments are rendered by the client computer at the time specified by the timestamps contained in each code fragment. The time stamps are read and interpreted by applet 130 in the context of the client computer's synchronized application clock. This puts the user in the same time frame as the broadcast content, yielding a realistic, time-oriented, interactive experience.

Figure 4:
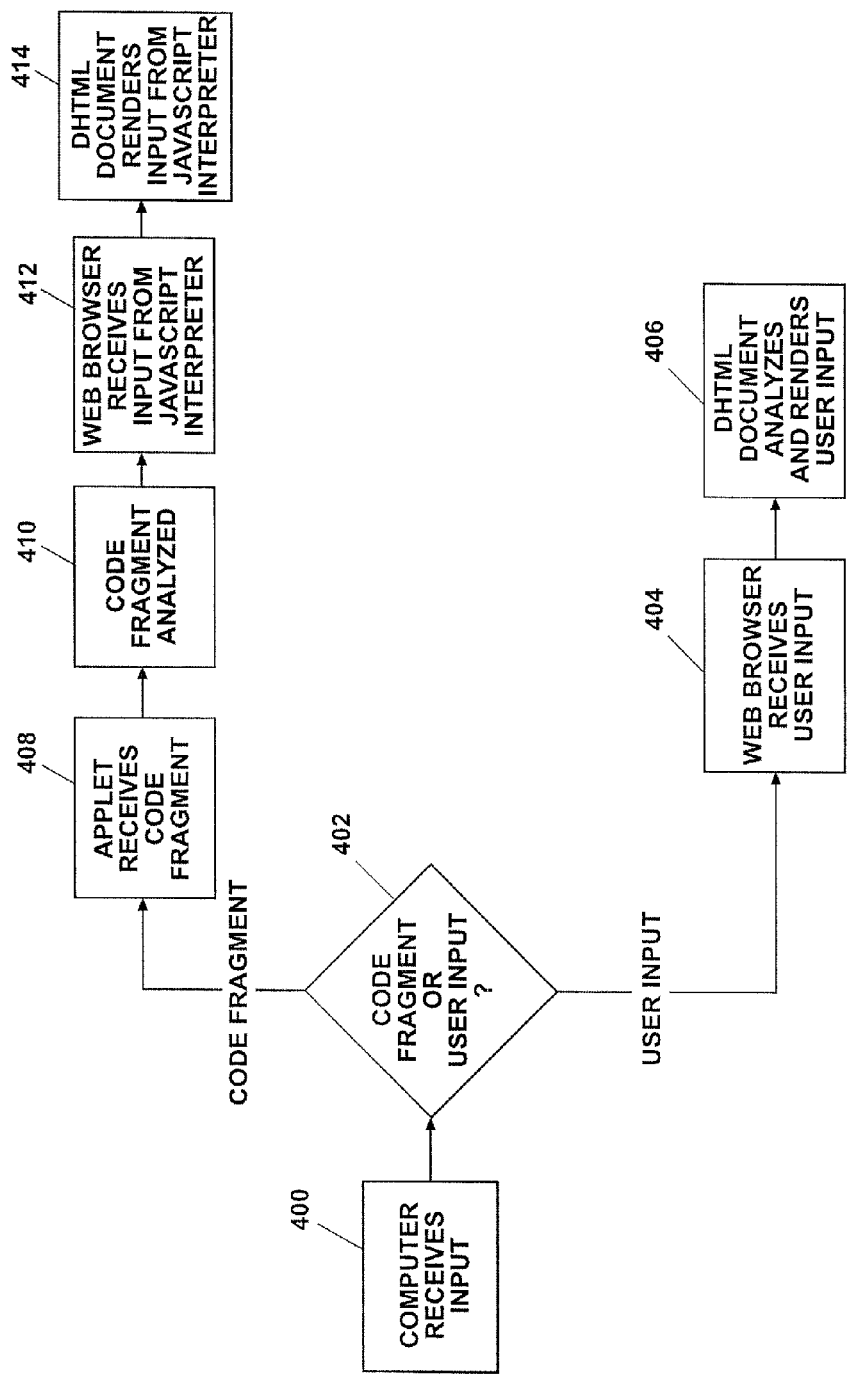
FIG. 4 is a flow chart illustrating functionality exemplary of a client-side software application according to an embodiment of the present invention.

FIG. 4 is a flow diagram illustrating logic that is exemplary of DHTML document 200 with embedded applet 130. In step 400 client computer 120 receives an input. This input may be a code fragment 106 sent by the broadcaster and delivered over the Internet, or it may be an input 134 from a user 102 of the system. In step 402, the source of the input is determined. If the input is a user input 134, it is automatically directed to Web browser 128 at step 404, where it is rendered within DHTML document 200 therein at step 406. This will cause at least a portion of the current display of monitor 132 to change or update, as a result of the user input 134.

For example, the user input 134 may be an answer in response to a question posed on the user's display monitor 132 or television 118. If the user enters a correct answer, DHTML document 200 resident in Web browser 128 will cause monitor 132 to display a flashing "Correct!" graphic on the computer screen.

If, on the other hand, the computer input is determined at step 402 to be a code fragment 106, embedded applet 130 receives the code fragment at 408 and directs it to be analyzed at 410. The analysis is as described with reference to FIG. 2 and FIG. 3, though it can involve further processing. Here, for example, the JavaScript interpreter recognizes a time stamp indicating when code fragment 106 should be rendered and displayed according to computer's 120 synchronized application clock. Based on the analysis, Web browser 128 receives code fragment 106 at the correct time at 412, and subsequently, at 414, DHTML 200 document therein renders the input received from the JavaScript interpreter.

For purposes of illustration, an exemplary scenario that may be employed within the scope of the present invention is provided. The exemplary scenario involves a television game show in which users may both watch the contestant on a television set and compete against the contestant through a computer. Both the individual users and the contestant are challenged by the same game and are subject to the same timing constraints and limitations. As a result, both the individual users and the contestant can control the outcome of the game. Thus, unlike ordinary television, enhanced television systems of the present invention enable a user at home to participate in and to enjoy an interactive experience by directly participating in the televised game show.

Figure 5:
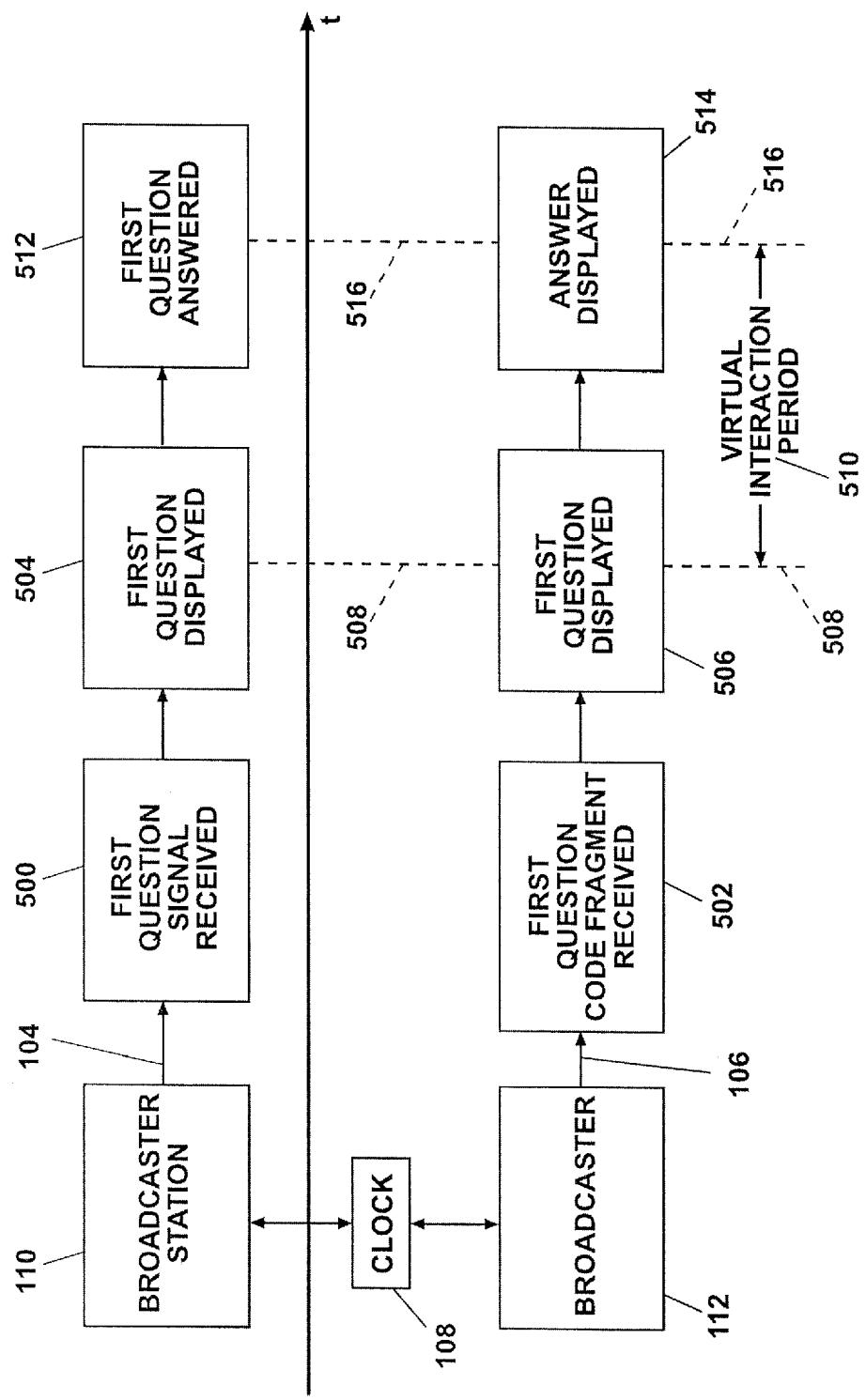
FIG. 5 illustrates an exemplary scenario occurring in an enhanced broadcasting system according to an embodiment of the present invention.

A sequence of events which may occur in the exemplary game show scenario is illustrated in FIG. 5. As previously described, a broadcast signal 104 is sent by the broadcaster station 110, and broadcast enhancements 106 is sent from broadcaster authoring system 112 by push server 114. The broadcast and its enhancements are synchronized according to house clock 108. In this exemplary illustration of the present invention, the game show comprises questions which both the television contestant and the individual user may answer. Points are earned by each according to whether their respective answers are correct or incorrect.

For example, the game show may begin with a first question, sent in the broadcast signal 104 and in a code fragment 106 created with broadcast authoring system 112. This question is received in its broadcast fours by a individual user's television at 500, and in its code fragment form by the user's computer at 502. The user sees or hears the question when it is presented on his television at 504, and simultaneously sees or hears the question on his computer at 506. At this point in time 508, a period of interaction 510 begins. The user is free to ponder and answer the question at 512, at any time within interaction period 510. At 514, when the contestant on television runs out of time or submits an answer that may be seen or heard by the user on the television, a code fragment is sent or a previously-sent time stamp is read which causes the user to lose the ability to submit an answer to the computer. At this time 516 the period of interaction 510 ends.

Thus, the contestant and the individual users are subject to the same time constraints and rules. The contestant on television may be rewarded for a correct answer to the question; similarly, if correct, the individual user also will receive affirmation through a display or sound on the computer acknowledging such. With each new question, new periods of interaction 510 occur, enabling an user to enjoy a unique, interactive experience that was unachievable prior to the present invention.

Another feature of the present invention is its ability to enable a large number of remote users to compete against one another. Referring back to FIG. 1, assets 124 are communicated bi-directionally, such that any individual user's 102 activity can be reported back to broadcaster 100. By tracking and storing all incoming scoring data, users playing a game through the enhanced television systems of the present invention and achieving various levels of scores can, in effect, compete against one another.

FIG. 6 illustrates an exemplary procedure of the present invention in which users can actively compete against one another. As part of the display hosted by a user's Web browser 128, a leaderboard 600 can be provided in accordance with the teachings of the present invention to inform users of their relative scores. A "top scores" leaderboard, for example, would display the names and ranks or scores of the highest ranked users at any point in time during an enhanced television game or event utilized by the present invention.

For example, the winning user would be named first in the leaderboard 602, followed by the second place user 604, and so on. Such reporting of winning standings provides users of the system with an incentive to continue playing and attempting to win. An alternative to the "top scores" leaderboard is a "local scores" leaderboard as illustrated in FIG. 7. This local scores listing would be based upon each individual user's standing. A "local scores" leaderboard 700 for a particular user would include that user's rank or score 702 in the middle of the list, several users 504 ranked below that user, and several users 706 ranked above the particular user.

The present invention provides yet another alternative mode of competition. Rather than being able to view only the top scoring users or the local scoring users, any user has the ability to select from a variety of pre-established groups of users, such that only users belonging to the selected group will appear on that group's leaderboard. In this manner, a user is able to organize and join groups of his or her preference.

In an exemplary embodiment, a user who establishes a group will select both its name and password. The selected group name and password are proposed by the user to the broadcaster Web server 122, where they are verified for uniqueness. If no other group exists with an identical name/password combination, Web server 122 designates the user-selected group name and password.

Once a group is established, any user in possession of the group's name and password can join that group, such as through the dialog box shown in FIG. 8. The user simply selects a desired group, such as through a drop-down menu 802, and enters the associated password, such as through input field 804. The information is then sent to Web server 122, which recognizes that the user is now a member of the selected group. During a game, Web server 122 delivers the scores of all users who have joined the group, and DHTML document 200 organizes those scores to create a personalized leaderboard in accordance with the teachings of the present invention. In this way, a user can invite anyone, such as a family member or friends, or any number of other users to join a customized group competition. This feature of the present invention enables a personal competitive ability not offered or found in prior art systems.

The foregoing description of the exemplary embodiments of the present invention has been presented for the purposes of illustration and description. It is not intended to be exhaustive or to limit the scope of the invention to the precise form disclosed. Many modifications and variations of the present invention are possible in light of the above teachings. For example, broadcasts involving content other than game shows may be utilized within the scope of the present invention. Also, displaying the enhanced portion of the broadcast of the present invention can be accomplished with alternative visual software other than a web browser or applet viewer. It is also contemplated as being within the scope of the present invention to enable the user to submit inputs to the broadcaster for various alternative feedback purposes. Additionally, it is within the scope of the present invention for a user to select other users for the formation of a competitive group for purposes of comparing scores such as in a leaderboard. The present invention also is not limited to being used for broadcast enhancements and interaction across the Internet alone. Rather, the invention may be used for different types of enhancement programs across a wide variety of computer and communications networks.

It is intended that the scope of the invention be limited not by this detailed description, but rather by the claims appended hereto.

What is claimed is:

1. An enhanced broadcasting system for presenting enhancements to audio or video broadcasts, the system comprising:
   a message including at least one instruction correlated to content contained in a separate audio and video broadcast signal;
   a client device configured for receiving the message;
   a storage medium associated with the client device that stores enhanced content to be displayed;
   the client device executing software for interpreting the at least one instruction and correlating the at least one instruction to the audio and video broadcast signal, and locally modifying the enhanced content in an exclusively local interaction based on the interpreted at least one instruction; and
   a display unit, connected to the client device, having a screen display that displays the enhanced content at a first time and displays a subsequent modification to the enhanced content based upon the interpreted at least one instruction of the message at a second time.

2. The enhanced broadcasting system of claim 1, wherein each message describes only a portion of the enhanced content to be displayed, such that only a portion of the enhanced content is modified in response to each message that is received.

3. The enhanced broadcasting system of claim 1 further comprising:
   an application clock operatively connected to said client device and synchronized to a house clock such that the broadcast signal and the message are correlated with respect to time.

4. The enhanced broadcasting system of claim 1 wherein the software is an applet.

5. The enhanced broadcasting system of claim 1 wherein the client device receives the message through a communication network.

6. The enhanced broadcasting system of claim 5 wherein the communication network is the Internet.

7. The enhanced broadcasting system of claim 1, wherein the client device executes software for interpreting the at least one instruction of the message to locally modify the enhanced content for a limited interactivity period.

8. A method for providing enhanced television broadcasting, the method comprising:
   receiving at a client device an enhancement related to a presentation of content of an audio and video signal, the related enhancement being received over a network and including at least one instruction;
   interpreting at least one instruction included in the related enhancement, which instruction is correlated to the content of the audio and video signal;

locally modifying at the client device enhanced content to be displayed in an exclusively local interaction based on the interpreted instruction; and displaying the modified enhanced content on a screen display connected to the client device which is updated based upon the interpreted instruction.

9. The method for providing enhanced television broadcasting of claim 8, wherein the related enhancement comprises a message including at least one instruction.

10. The method for providing enhanced television broadcasting of claim 9, wherein each message describes only a portion of the enhanced content to be displayed, such that only a portion of the enhanced content is modified in response to each message that is received.

11. The method for providing enhanced television broadcasting of claim 9, wherein the message includes a timestamp.

12. The method for providing enhanced television broadcasting of claim 8, further comprising:

displaying the modified enhanced content on a computer display;

receiving the audio and video signal; and displaying content of the audio and video signal on a television.

13. The method for providing enhanced television broadcasting of claim 8, further comprising:

receiving an input from a user of the client device;

executing software on the client device to analyze the input;

assigning points to the user according to the analyzed input, such that the user accumulates an earned score.

14. The method for providing enhanced television broadcasting of claim 13, further comprising:

delivering to a particular user earned scores of each of a plurality of users;

organizing the delivered earned scores accordingly to their relative values; and displaying the organized earned scores to be viewed by the particular user.

15. The method for providing enhanced television broadcasting of claim 14 wherein the plurality of users is selected by the particular user.

16. The method for providing enhanced television broadcasting of claim 14 wherein the delivering of earned scores of a plurality of users to a particular user is in response to the particular user joining a group comprising the plurality of users.

17. The method for providing enhanced television broadcasting of claim 15 wherein the joining comprises the steps of:

providing a group name assigned to the group; and providing a password assigned to the group and uniquely associated with the group name.

18. The method of claim 8, further comprising:

receiving the input from the user of the client device during a limited interactivity period;

executing software on the client device to analyze the input;

assigning points to the user according to the analyzed input only during the limited interactivity period, such that the user accumulates an earned score.

19. A method for providing enhanced television broadcasting, the method comprising:

selecting a common time for a synchronized presentation of content an audio and video signal and a related enhancement, the related enhancement including at least one instruction; and sending the related enhancement over a network for receipt by a client device, wherein the related enhancement includes at least one instruction correlated to the content of the audio and video signal to be interpreted by the client device to locally modify at the client device enhanced content to be displayed in an exclusively local interaction based on the interpreted instruction.

20. The method for providing enhanced television broadcasting of claim 19 further comprising:

assigning a group name to a group, the group capable of being accessed by a plurality of users;

assigning a password to the group, such that the group name and the password are uniquely associated;

storing the uniquely associated group name and password;

receiving a query group name and a query password from a joining user;

comparing the query group name and query password received from the joining user to the stored uniquely associated group name and password;

providing the joining user access to the group if the query group name and query password are identical to the stored uniquely associated group name and password; and reporting to each user having access to the group the earned score of all users having access to the group.

21. The method for providing enhanced television broadcasting of claim 19 further comprising sending the related enhancement separately from the audio and video signal.

22. The method for providing enhanced television broadcasting of claim 19 further comprising:

ranking the earned scores of the plurality of users having access to the group to determine a relative score for each user having access to the group; and reporting, to each user having access to the group, the relative scores, wherein the reporting comprises displaying the relative scores in ranked order within a leaderboard.

23. An enhanced broadcasting system for presenting audio or video broadcasts and related enhancements, the system comprising:

an authoring system for selecting a common time for a synchronized presentation of content an audio and video signal and a related enhancement, the related enhancement including at least one instruction, the authoring system generating the at least one instruction of the related enhancement such that the at least one instruction is correlated to the content of the audio and video broadcast signal; and a push server for delivering the related enhancement over a network for receipt by a client device, wherein the related enhancement includes at least one instruction correlated to the content of the audio and video signal to be interpreted by the client device to locally modify at the client device enhanced content to be displayed in an exclusively local interaction based on the interpreted instruction.

24. The enhanced broadcasting system of claim 23 wherein the related enhancement is a message.

25. The enhanced broadcasting system of claim 24, wherein each message describes only a portion of the enhanced content to be displayed, such that only a portion of the enhanced content is modified in response to each message that is delivered.

26. The enhanced broadcasting system of claim 24 wherein the authoring system generates the at least one instruction of the message as the audio and video broadcast signal is broadcast.

27. The enhanced broadcasting system of claim 23 wherein the related enhancement is sent separately from the audio and video signal.

28. An enhanced broadcasting system for presenting audio or video broadcasts and related enhancements, the system comprising:
- a client device configured to receive a message and execute at least one instruction in the message to locally modify enhanced content to be displayed that is stored at the client device in an exclusively local interaction based on the at least one instruction, wherein the at least one instruction in the message is correlated to content of an audio and video broadcast signal; and
- a display, connected to the client device, having a screen display that displays the enhanced content at a first time and displays a subsequent modification to the enhanced content based upon execution of the at least one instruction in the message at a second time.

29. The enhanced broadcasting system of claim 28, wherein each message describes only a portion of the enhanced content to be displayed, such that only a portion of the enhanced content is modified in response to each message that is received.

30. The enhanced broadcasting system of claim 28, further comprising:
- a receiver that receives the audio and video broadcast signal;
- an audio and video broadcast signal display, connected to the receiver, for displaying content of the audio and video broadcast signal.

31. The enhanced broadcasting system of claim 28, wherein the client device receives the message through a communication network.

32. The enhanced broadcasting system of claim 31, wherein the communication network is the Internet.

33. The enhanced broadcasting system of claim 28, further comprising an input device configured to receive an input from the user based on the updated screen display of the display.

34. The enhanced broadcasting system of claim 33, further comprising a transmitter that transmits the input from the user to a broadcaster to be included in a broadcast signal broadcast by the broadcaster.

35. The enhanced broadcasting system of claim 28, wherein the client device is further configured to receive an input from a user during a limited interactivity period.

36. A method for providing enhanced television broadcasting, the method comprising:
- receiving at a client device an enhancement related to and synchronized with a presentation of content of an audio and video signal, the related enhancement being received over a network and including at least one instruction;
- interpreting at least one instruction included in the related enhancement, which instruction is correlated to the content of the audio and video signal;
- locally modifying at the client device enhanced content to be displayed based on the interpreted instruction;
- displaying the modified enhanced content on a screen display which is updated based upon the interpreted instruction;
- receiving an input from a user of the client device during a limited interactivity period; and
- executing software on the client device to analyze the input only during the limited interactivity period.

37. The method of claim 36, further comprising synchronizing the limited interactivity period for user input with a period associated with the content of displayed audio and video signal.

38. The method of claim 36, further comprising receiving an ending instruction at the client device instructing the software executing on the client device to end the limited interactivity period.

* * * * *